US009854268B2

(12) United States Patent
Chen et al.

(10) Patent No.: US 9,854,268 B2
(45) Date of Patent: Dec. 26, 2017

(54) METHOD AND APPARATUS OF MOTION DATA BUFFER REDUCTION FOR THREE-DIMENSIONAL VIDEO CODING

(71) Applicant: HFI Innovation Inc., Zhubei, Hsinchu County (TW)

(72) Inventors: Yi-Wen Chen, Taichung (TW); Jian-Liang Lin, Su'ao Township Yilan County (TW); Yu-Wen Huang, Taipei (TW)

(73) Assignee: HFI INNOVATION INC., Zhubei, Hsinchu County (TW)

( * ) Notice: Subject to any disclaimer, the term of this patent is extended or adjusted under 35 U.S.C. 154(b) by 447 days.

(21) Appl. No.: 14/433,356

(22) PCT Filed: Sep. 18, 2013

(86) PCT No.: PCT/CN2013/083746
§ 371 (c)(1),
(2) Date: Apr. 2, 2015

(87) PCT Pub. No.: WO2014/053087
PCT Pub. Date: Apr. 10, 2014

(65) Prior Publication Data
US 2015/0350676 A1    Dec. 3, 2015

Related U.S. Application Data

(60) Provisional application No. 61/744,858, filed on Oct. 3, 2012.

(51) Int. Cl.
H04N 7/12      (2006.01)
H04N 19/597    (2014.01)
(Continued)

(52) U.S. Cl.
CPC ......... H04N 19/597 (2014.11); H04N 19/115 (2014.11); H04N 19/13 (2014.11);
(Continued)

(58) Field of Classification Search
CPC .... H04N 19/597; H04N 19/33; H04N 19/428; H04N 9/15; H04N 19/115; H04N 19/176
(Continued)

(56) References Cited

U.S. PATENT DOCUMENTS 8,411,750 B2 *   4/2013   Dane ............... H04N 19/513
                                              375/240.01
9,635,355 B2 *   4/2017   Chen ............... H04N 19/136
(Continued)

FOREIGN PATENT DOCUMENTS

EP    2 892 235    7/2015
GB    2488815      9/2012
(Continued)

OTHER PUBLICATIONS

Chen, Y.W., et al.; "Motion data buffer reduction for 3D-HEVC;" Joint Collaborative Team on 3D Video Coding Extension Development of ITU-T SG 16 WP 3 and ISO/IEC JTC 1/SC 29/WG 11; Oct. 2012; pp. 1-4.
(Continued)

*Primary Examiner* — Tung Vo
(74) *Attorney, Agent, or Firm* — McClure, Qualey & Rodack, LLP

(57) ABSTRACT

A method and apparatus for three-dimensional video coding, multi-view video coding and scalable video coding are disclosed. Embodiments of the present invention use two stage motion data compression to reduce motion data buffer requirement. A first-stage motion data compression is applied after each texture picture or depth map is coded to reduce motion data buffer requirement. Accordingly, first
(Continued)

compressed motion data is stored in reduced resolution in the buffer to reduce storage requirement and the first compressed motion data is used for coding process of other texture pictures or depth maps in the same access unit. After all pictures in an access unit are coded, motion data associated with the access unit is further compressed and the second compressed motion data is used during coding process of pictures in other access unit.

18 Claims, 8 Drawing Sheets

(51) Int. Cl.
    *H04N 19/426* (2014.01)
    *H04N 19/13* (2014.01)
    *H04N 19/15* (2014.01)
    *H04N 19/176* (2014.01)
    *H04N 19/115* (2014.01)
    *H04N 19/513* (2014.01)
    *H04N 19/33* (2014.01)

(52) U.S. Cl.
    CPC .......... *H04N 19/15* (2014.11); *H04N 19/176* (2014.11); *H04N 19/33* (2014.11); *H04N 19/426* (2014.11); *H04N 19/428* (2014.11); *H04N 19/513* (2014.11)

(58) Field of Classification Search
    USPC ..................................... 375/240.16
    See application file for complete search history.

(56) References Cited

U.S. PATENT DOCUMENTS

| | | | | |
|---|---|---|---|---|
| 9,674,525 | B2 * | 6/2017 | Chen | H04N 19/50 |
| 2010/0266042 | A1 * | 10/2010 | Koo | H04N 19/597 |
| | | | | 375/240.16 |
| 2010/0316122 | A1 * | 12/2010 | Chen | H04N 21/23432 |
| | | | | 375/240.12 |
| 2010/0316134 | A1 * | 12/2010 | Chen | H04N 21/21805 |
| | | | | 375/240.25 |
| 2011/0032999 | A1 * | 2/2011 | Chen | H04N 21/23432 |
| | | | | 375/240.26 |
| 2012/0229602 | A1 * | 9/2012 | Chen | H04N 19/597 |
| | | | | 348/43 |
| 2012/0236934 | A1 * | 9/2012 | Chen | H04N 19/597 |
| | | | | 375/240.03 |
| 2012/0269271 | A1 * | 10/2012 | Chen | H04N 19/597 |
| | | | | 375/240.16 |
| 2012/0328004 | A1 * | 12/2012 | Coban | H04N 19/105 |
| | | | | 375/240.03 |
| 2013/0022111 | A1 * | 1/2013 | Chen | H04N 19/50 |
| | | | | 375/240.12 |
| 2013/0022113 | A1 * | 1/2013 | Chen | H04N 19/597 |
| | | | | 375/240.12 |
| 2013/0057646 | A1 * | 3/2013 | Chen | H04N 19/597 |
| | | | | 348/43 |
| 2013/0088570 | A1 * | 4/2013 | Takahashi | H04N 13/0048 |
| | | | | 348/43 |
| 2013/0114670 | A1 * | 5/2013 | Chen | H04N 19/00139 |
| | | | | 375/240.02 |
| 2013/0114705 | A1 * | 5/2013 | Chen | H04N 19/00569 |
| | | | | 375/240.12 |
| 2013/0170552 | A1 * | 7/2013 | Kim | H04N 19/597 |
| | | | | 375/240.16 |
| 2013/0176389 | A1 * | 7/2013 | Chen | H04N 19/597 |
| | | | | 348/43 |
| 2013/0182760 | A1 | 7/2013 | Sasai et al. | |
| 2013/0294522 | A1 | 11/2013 | Lim et al. | |
| 2014/0126642 | A1 * | 5/2014 | Takahashi | H04N 19/597 |
| | | | | 375/240.16 |
| 2014/0192154 | A1 * | 7/2014 | Jeong | H04N 19/597 |
| | | | | 348/43 |
| 2014/0192155 | A1 * | 7/2014 | Choi | H04N 19/00769 |
| | | | | 348/43 |
| 2014/0198850 | A1 * | 7/2014 | Choi | H04N 19/597 |
| | | | | 375/240.15 |

FOREIGN PATENT DOCUMENTS

| | | |
|---|---|---|
| KR | 1020120088611 | 8/2012 |
| WO | WO 2012/042893 | 4/2012 |
| WO | WO 2012/058909 | 5/2012 |
| WO | WO 2012/105807 A2 | 8/2012 |
| WO | WO 2012/119777 | 9/2012 |

OTHER PUBLICATIONS

Zou, R., et al.; "An Adaptive Motion Data Storage Reduction Method for Temporal Predictor;" PSIVT; Part II; 2011; pp. 48-59.
Su, Y., et al.; "CE9: Reduced resolution storage of motion vector data;" Joint Collaborative Team on Video Coding (JCT-VC) of ITU-T SG16 WP3 and ISO/IEC JTC1/SC29/WG11; Jan. 2011; pp. 1-4.
International Search Report dated Dec. 26, 2013, issued in PCT/CN2013/083746.

\* cited by examiner

METHOD AND APPARATUS OF MOTION DATA BUFFER REDUCTION FOR THREE-DIMENSIONAL VIDEO CODING

CROSS REFERENCE TO RELATED APPLICATIONS

The present invention is a National Stage of PCT/CN2013/083746, filed on Sep. 18, 2013, which claims priority to U.S. Provisional Patent Application Ser. No. 61/744,858, filed on Oct. 3, 2012, entitled "Motion Data Storage Reduction (MDSR) for Video Coding". The priority applications are hereby incorporated by reference in their entirety.

TECHNICAL FIELD

The present invention relates to three-dimensional video coding. In particular, the present invention relates to motion data buffer reduction in three-dimensional video coding.

BACKGROUND

Three-dimensional (3D) television has been a technology trend in recent years that intends to bring viewers sensational viewing experience. Various technologies have been developed to enable 3D viewing. The multi-view video is a key technology for 3DTV application among others. The traditional video is a two-dimensional (2D) medium that only provides viewers a single view of a scene from the perspective of the camera. However, the multi-view video is capable of offering arbitrary viewpoints of dynamic scenes and provides viewers the sensation of realism.

The multi-view video is typically created by capturing a scene using multiple cameras simultaneously, where the multiple cameras are properly located so that each camera captures the scene from one viewpoint. Accordingly, the multiple cameras will capture multiple video sequences corresponding to multiple views. In order to provide more views, more cameras have been used to generate multi-view video with a large number of video sequences associated with the views. Accordingly, the multi-view video will require a large storage space to store and/or a high bandwidth to transmit. Therefore, multi-view video coding techniques have been developed in the field to reduce the required storage space or the transmission bandwidth.

Various techniques to improve the coding efficiency of 3D video coding have been disclosed in the field. There are also development activities to standardize the coding techniques. For example, a working group, ISO/IEC JTC1/SC29/WG11 within ISO (International Organization for Standardization) is developing an HEVC (High Efficiency Video Coding) based 3D video coding standard. In HEVC, the motion information of the temporal motion parameters (e.g. motion vectors (MVs), reference index and prediction mode) can be used for MV prediction. Therefore, the motion parameters from previous pictures need to be stored in a motion parameters buffer. However, the size of motion parameters buffer may become quite significant because the granularity of motion representation is at 4×4 block size. There are two motion vectors for each prediction unit (PU) in the B-slices (bi-predicted slice). In order to reduce the size of the motion parameters buffer, a motion compression process, named motion data storage reduction (MDSR), is utilized to store the decoded motion information from previous pictures at lower resolution. During encoding or decoding process, the decoded motion information associated with a current frame is used to reconstruct a current frame. After the current frame is reconstructed, the motion information is stored at coarser granularity for other frames to reference.

In HEVC, the reduction of motion information buffer is achieved by a decimation method. FIG. 1 shows an example of motion data storage reduction based on decimation. In this example, the motion data compression is conducted for each 16×16 block. All 4×4 blocks within the 16×16 block share the same motion vectors, reference picture indices and prediction mode of the representative block. In the HEVC standard, the top-left 4×4 block (i.e., block 0) is used as the representative block for the whole 16×16 block. For convenience, each 16×16 block is referred as a motion sharing area in this disclosure since all the smallest blocks within the 16×16 block share the same motion parameters. While 16×16 block size is being used in the HEVC standard, the motion sharing area may have other block sizes.

In the international coding standard development, three-dimensional video coding and scalable video coding are two possible extensions to the conventional two-dimensional HEVC video coding standard. FIG. 2 shows an exemplary prediction structure used in the HEVC-based 3D video coding Version 4.0 (HTM-4.0). The video pictures (210A) and depth maps (210B) corresponding to a particular camera position are indicated by a view identifier (viewID). For example, video pictures and depth maps associated with three views (i.e., V0, V1 and V2) are shown in FIG. 2. All video pictures and depth maps that belong to the same camera position are associated with the same viewId. The video pictures and, when present, the depth maps are coded access unit (AU) by access unit, as shown in FIG. 2. An AU (220) includes all video pictures and depth maps corresponding to the same time instant. In HTM-4.0, the motion data compression is performed for each picture after all the pictures (both texture and depth) within the same AU are coded. In this case, for each AU, the reconstruction process for pictures within the AU can rely on full-resolution motion data associated with the current AU. The motion data compression will only affect the reconstruction process of other AUs that refer the compressed motion data associated with the current AU.

As for scalable video coding (SVC), three types of scalabilities including temporal scalability, spatial scalability and quality scalability are being considered for scalable extension of HEVC. SVC uses the multi-layer coding structure to realize three dimensions of scalability. The prediction structure can be similar to that for 3D video coding, where the inter-view prediction (i.e., prediction in the view direction) is replaced by inter-layer dimension (i.e., prediction in the layer direction). Furthermore, in SVC, only texture information is involved and there is no depth map.

FIG. 3 illustrates an exemplary three-layer SVC system, where the video sequence is first down-sampled to obtain smaller pictures at different spatial resolutions (layers). For example, picture 310 at the original resolution can be processed by spatial decimation 320 to obtain resolution-reduced picture 311. The resolution-reduced picture 311 can be further processed by spatial decimation 321 to obtain further resolution-reduced picture 312 as shown in FIG. 3. The SVC system in FIG. 3 illustrates an example of spatial scalable system with three layers, where layer 0 corresponds to the pictures with lowest spatial resolution and layer 2 corresponds to the pictures with the highest resolution. The layer-0 pictures are coded without reference to other layers, i.e., single-layer coding. For example, the lowest layer picture 312 is coded using motion-compensated and Intra prediction 330. In FIG. 3, while spatial scalability is achieved using spatial decimation, quality scalability is achieved by using SNR (Signal to Noise Ratio) enhancement. The temporal scalability can be achieved using techniques such as hierarchical temporal picture structure.

The motion-compensated and Intra prediction 330 will generate syntax elements as well as coding related information such as motion information for further entropy coding 340. FIG. 3 actually illustrates a combined SVC system that provides spatial scalability as well as quality scalability (also called SNR scalability). For each single-layer coding, the residual coding errors can be refined using SNR enhancement layer coding 350. The SNR enhancement layer in FIG. 3 may provide multiple quality levels (quality scalability). Each supported resolution layer could be coded by respective single-layer motion-compensated and Intra prediction similar to a non-scalable coding system. Each higher spatial layer may also be coded using inter-layer coding based on one or more lower spatial layers. For example, spatial layer 1 video can be adaptively coded using inter-layer prediction based on layer 0 video or a single-layer coding. Similarly, spatial layer 2 video can be adaptively coded using inter-layer prediction based on reconstructed spatial layer 1 video or a single-layer coding. As shown in FIG. 3, spatial layer-1 pictures 311 can be coded by motion-compensated and Intra prediction 331, base layer entropy coding 341 and SNR enhancement layer coding 351. As shown in FIG. 3, the reconstructed BL video data is also utilized by motion-compensated and Intra prediction 331, where a coding block in spatial layer 1 may use the reconstructed BL video data as an additional Intra prediction data (i.e., no motion compensation is involved). Similarly, layer-2 pictures 310 can be coded by motion-compensated and Intra prediction 332, base layer entropy coding 342 and SNR enhancement layer coding 352. The BL bitstreams and SNR enhancement layer bitstreams from all spatial layers are multiplexed by multiplexer 360 to generate a scalable bitstream.

As mentioned before, the motion vector compression in HTM-4.0 is performed for each picture after all pictures (both texture and depth) within the same AU are coded. Therefore, the motion information associated with all pictures (both texture and depth) within the same AU has to be buffered temporarily before motion vector compression is performed. FIG. 4 illustrates motion data buffer requirement according to HTM-4.0. The video pictures (T0, T1 and T2) and depth maps (D0, D1 and D2) are associated with AU 0 (410). The full-resolution motion information is stored in motion data buffer 420, where block 420A corresponds to motion data associated with picture T0 and block 420B corresponds to motion data associated with depth map D0. After all texture pictures and depth maps in AU 0 are coded, the full-resolution motion information is compressed to $1/16$-resolution motion data (430), where block 430A corresponds to compressed motion data associated with picture T0 and block 430B corresponds to compressed motion data associated with depth map D0. When a 3D sequence involves a large number of views, the required motion data buffer may be quite sizeable. Therefore, it is desirable to develop techniques for 3DVC to reduce the motion data buffer requirement. Similarly, it is desirable to reduce the required motion data buffer for SVC with minor coding performance drop compared to storing the motion data at full resolution. For SVC, a set of images across all layers can be considered as an equivalent AU in 3DVC. For example, a set of pyramid images associated with a time instance can be considered as an AU in order to unify the discussion in the disclosure.

SUMMARY

A method and apparatus for three-dimensional video coding, multi-view video coding and scalable video coding are disclosed. Embodiments of the present invention use two-stage motion data compression. Compared to the conventional approach, an additional stage of motion data compression is applied according to the present invention after each texture picture or depth map is coded in order to reduce motion data buffer requirement. Accordingly, compressed motion data is stored in the buffer to reduce storage requirement and the compressed motion data is used for coding process of other texture pictures or depth maps in the same access unit. The motion data compression is applied to a picture unit in the access unit. The picture unit corresponds to a texture picture or depth map, or a slice of the texture picture or depth map. The picture unit is divided into smallest motion data blocks such as 4×4 blocks, and a motion sharing area (e.g., a 16×16 block) consisting of a first plurality of smallest motion data blocks is selected for motion data sharing. For the additional stage of motion data compression, the motion sharing area is divided into multiple to-be-compressed units (e.g., 8×8 blocks), and each to-be-compressed unit consists of a second plurality of smallest motion data blocks. Second representative motion data is selected for the second plurality of smallest motion data blocks to share. The second representative motion data represents the compressed motion data for the to-be-compressed unit and is stored in the motion data buffer. After all pictures in the access unit are coded, motion data associated with the access unit is further compressed and the compressed motion data is used during coding process of pictures in other access unit.

The representative motion data for a to-be-compressed unit may correspond to the motion data of a representative smallest motion data block in the to-be-compressed unit. For example, the top-left or bottom-right smallest motion data block of the to-be-compressed unit may be selected as the representative smallest motion data block. The representative motion data for the to-be-compressed unit may also correspond to dominant motion data, median motion data, average motion data, or linear motion data combination of all or a part of the smallest motion data blocks in the to-be-compressed unit. The representative motion data for a motion sharing area may correspond to the motion data of a representative smallest motion data block in the motion sharing area. For example, the top-left or bottom-right smallest motion data block of the motion sharing area may be selected as the representative smallest motion data block for motion sharing area. The representative motion data for the motion sharing area may correspond to dominant motion data, median motion data, average motion data, or linear motion data combination of all or a part of the smallest motion data blocks in the motion sharing area.

The two-stage motion data compression may be selectively applied to texture pictures and/or depth maps. For example, the two-stage motion data compression can be applied to texture pictures only while conventional motion data compression is applied to the depth maps. In another example, the two-stage motion data compression is applied to reference pictures only. In yet another example, the two-stage motion data compression is applied to dependent-view or enhancement-layer pictures only. In one embodiment, syntax is signaled in a sequence level, picture level or slice level of a video bitstream to indicate whether two-stage motion data compression is used.

BRIEF DESCRIPTION OF DRAWINGS

FIGS. 6A-C illustrate examples of representative 4×4 block selection for to-be-compressed 8×8 blocks.

DETAILED DESCRIPTION

Figure 1:
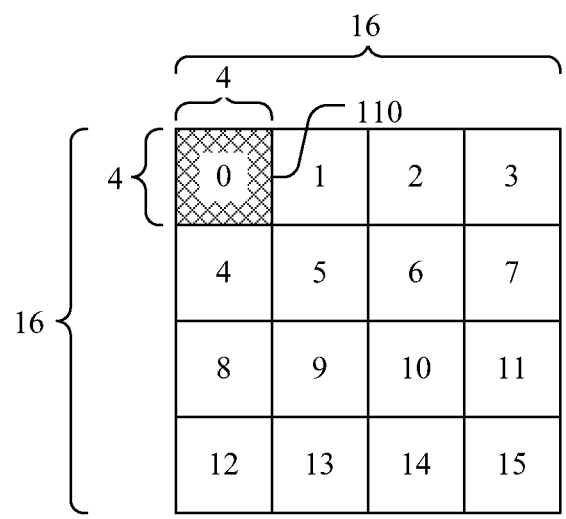
FIG. 1 illustrates an example of motion data compression based on motion data decimation adopted in High Efficiency Video Coding.
Figure 2:
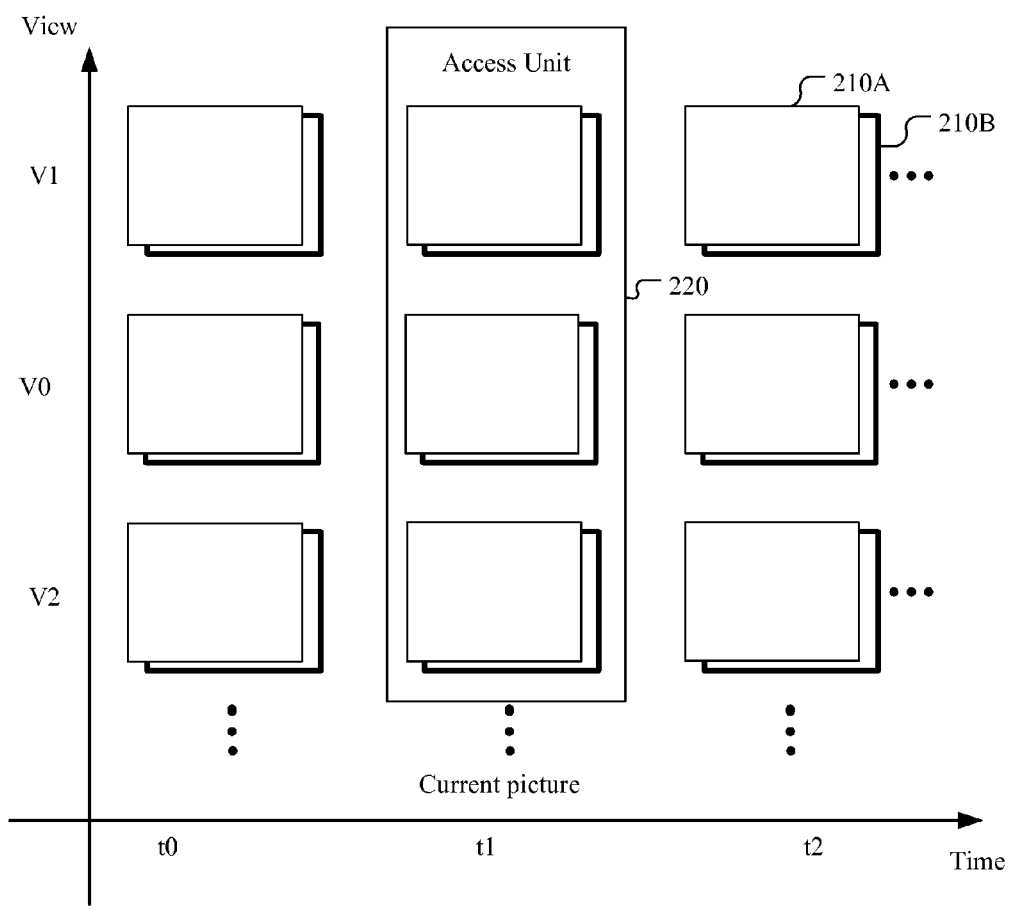
FIG. 2 illustrates an exemplary prediction structure used in the High Efficiency Video Coding based Test Model version 4.0 (HTM-4.0) for three-dimensional (3D) video coding.
Figure 3:
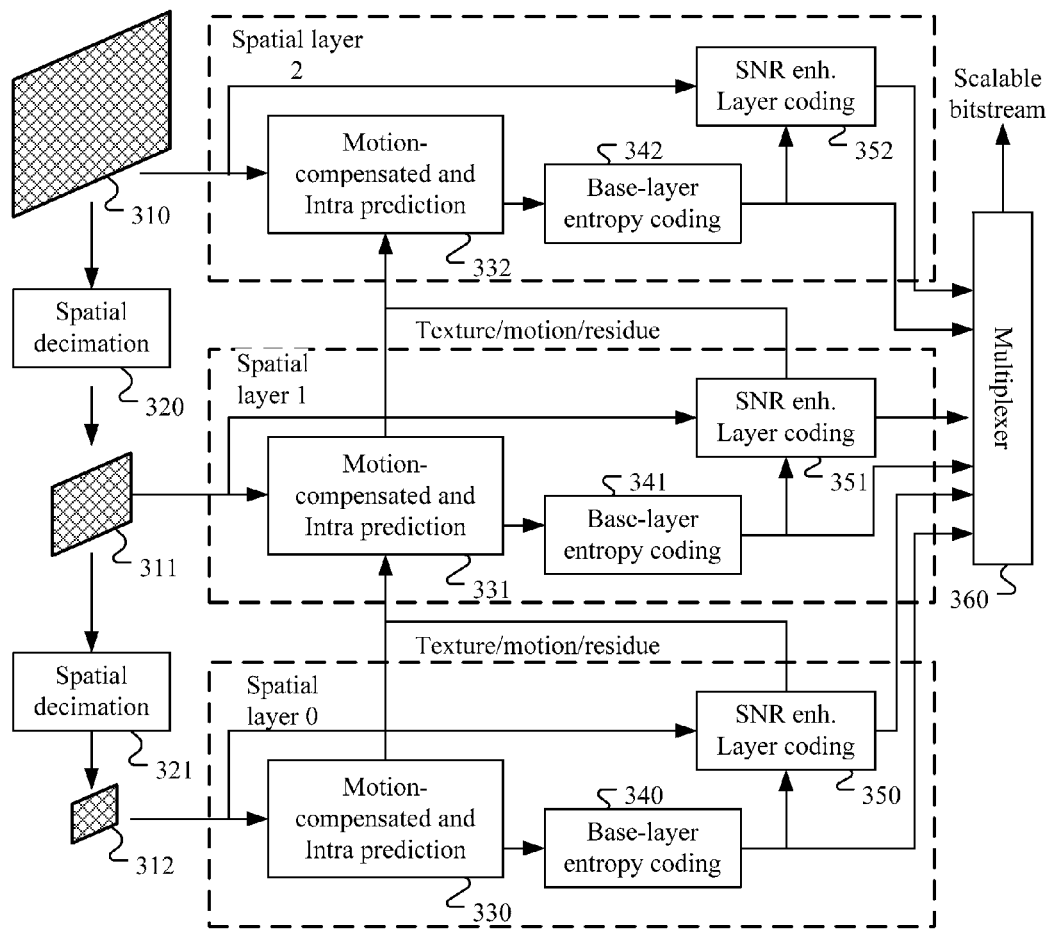
FIG. 3 illustrates an exemplary prediction structure of a three-layer scalable video coding system.
Figure 4:
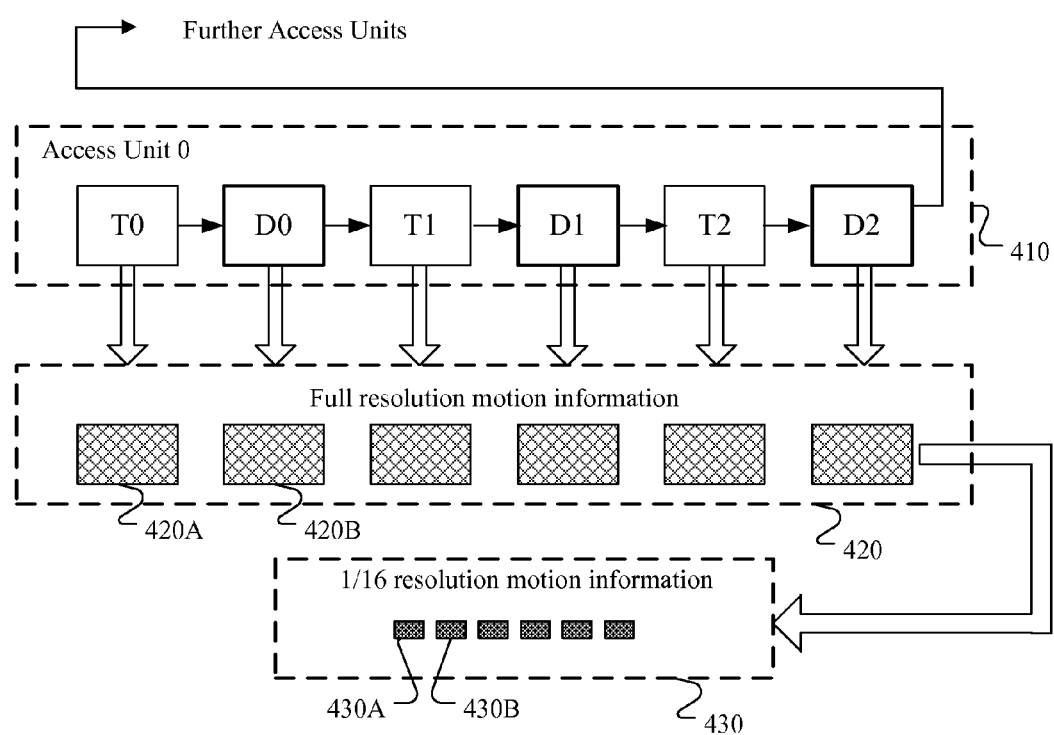
FIG. 4 illustrates an exemplary system diagram incorporating motion data compression according to the High Efficiency Video Coding based Test Model version 4.0 (HTM-4.0) for three-dimensional (3D) video coding.
Figure 5:
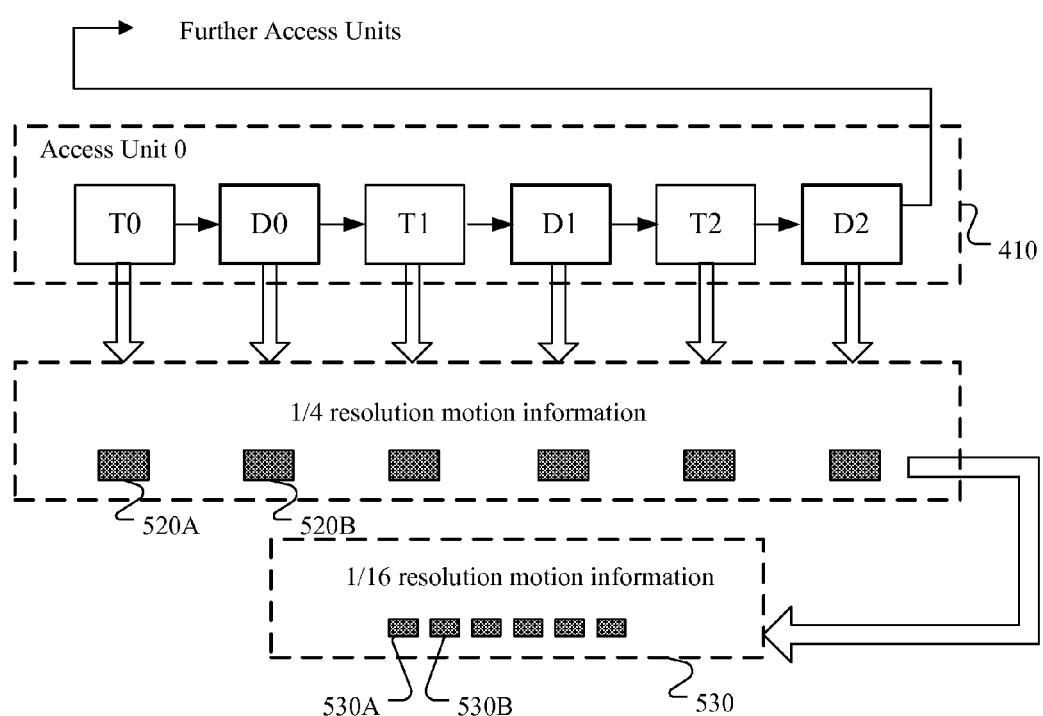
FIG. 5 illustrates an exemplary system diagram incorporating two-stage motion data compression according to an embodiment of the present invention.

The present invention reduces motion data buffer requirement for three-dimensional video coding, multi-view video coding and scalable video coding compared to storing the motion data at full resolution. In one embodiment, a two-stage motion data compression (also, referred as progressive motion data compression) scheme is disclosed for 3D video coding and scalable video coding. In the progressive scheme, two-stage motion data compression is performed. The first-stage motion data compression is performed after each picture (texture, depth or any types of picture) is coded. After all pictures within the same access unit (AU) are coded, the second-stage motion data compression is then performed on the motion data compressed by the first-stage for each picture. FIG. 5 illustrates an example of motion data buffer reduction according to the two-stage motion data compression scheme. The motion information associated with each picture (texture, depth or any types of picture) is compressed to ¼ resolution of the original motion information in the first stage after the picture is coded. Therefore, the motion data buffer only needs to store motion information in the ¼ resolution. For example, motion information associated with texture picture T0 is compressed to ¼ resolution (block 520A) after T0 is compressed. Motion information associated with depth map D0 is compressed to ¼ resolution (block 520B) after D0 is compressed. After all pictures and depth maps in AU 0 are coded, the ¼-resolution motion information is compressed by another 4:1 compression to ¹⁄₁₆-resolution motion data (530), where block 530A corresponds to compressed motion data associated with texture picture T0 and block 530B corresponds to compressed motion data associated with depth map D0. While 4:1 compression is used in both stage one and stage two compression, other compression ratios may also be used. For example, a 2:1 compression in the first stage and an 8:1 compression in the second stage can be used to achieve the same 16:1 compression.

The performance of motion data buffer compression incorporating a two-stage motion data compression scheme according to an embodiment of the present invention is compared with the performance of motion data buffer according to HTM-4.0 as shown in Table 1. The performance comparison is performed based on different sets of test data listed in the first column. The BD-rate differences are shown for texture pictures in view 0 (video 0), view 1 (video 1) and view 2 (video 2). A positive value in the BD-rate implies the present invention has a lower performance. As shown in Table 1, the BD-rate for texture pictures in view 1 and view 2 only lose about 0.1% performance measured by BD-rate. The second group of performance is the bitrate measure for texture video only (video PSNR/video bitrate), total bitrate for texture video and depth maps (video PSNR/total bitrate) and total bitrate for video of synthesized view (synth PSNR/total bitrate). As shown in Table 1, the average performance loss is negligible. The processing times (encoding time, decoding time and rendering time) are also compared. As shown in Table 1, the encoding time, decoding time and rendering time are about the same as conventional scheme. Accordingly, in the above example, the motion data buffer is reduced to ¼ of the original size while the performance is about the same.

TABLE 1

| | video 0 | video 1 | video 2 | video PSNR/video bitrate | video PSNR/total bitrate | synth PSNR/total bitrate | enc time | dec time | ren time |
|---|---|---|---|---|---|---|---|---|---|
| Balloons | 0.0% | 0.1% | 0.1% | 0.0% | 0.0% | 0.0% | 99.9% | 110.1% | 101.9% |
| Kendo | 0.0% | 0.1% | 0.1% | 0.0% | 0.0% | 0.1% | 100.0% | 97.9% | 99.2% |
| Newspaper_CC | 0.0% | 0.1% | 0.0% | 0.0% | 0.0% | −0.1% | 99.5% | 96.5% | 99.2% |
| GT_Fly | 0.0% | 0.3% | 0.1% | 0.0% | 0.0% | 0.0% | 99.8% | 100.6% | 98.7% |
| Poznan_Hall2 | 0.0% | −0.1% | −0.1% | 0.0% | 0.0% | 0.0% | 99.1% | 109.4% | 98.3% |
| Poznan_Street | 0.0% | 0.1% | 0.1% | 0.0% | 0.0% | 0.0% | 99.8% | 99.2% | 98.6% |
| Undo_Dancer | 0.0% | 0.0% | 0.1% | 0.0% | 0.0% | 0.1% | 99.5% | 104.8% | 100.6% |
| 1024 × 768 | 0.0% | 0.1% | 0.1% | 0.0% | 0.0% | 0.0% | 99.8% | 101.5% | 100.1% |
| 1920 × 1088 | 0.0% | 0.1% | 0.1% | 0.0% | 0.0% | 0.0% | 99.6% | 103.5% | 99.0% |
| average | 0.0% | 0.1% | 0.1% | 0.0% | 0.0% | 0.0% | 99.7% | 102.6% | 99.5% |

In the above example, the first-stage MV compression is performed after a picture is coded. However, another embodiment according to the present invention may also be performed for a picture unit smaller than a picture. For example, the first-stage motion data compression can also be performed after each slice, LCU row, or LCU is coded. After all pictures within the same access unit (AU) are coded, the second-stage motion data compression can then be performed on the motion data compressed by the first-stage for each picture.

Figures 6A, 6B, 6C:
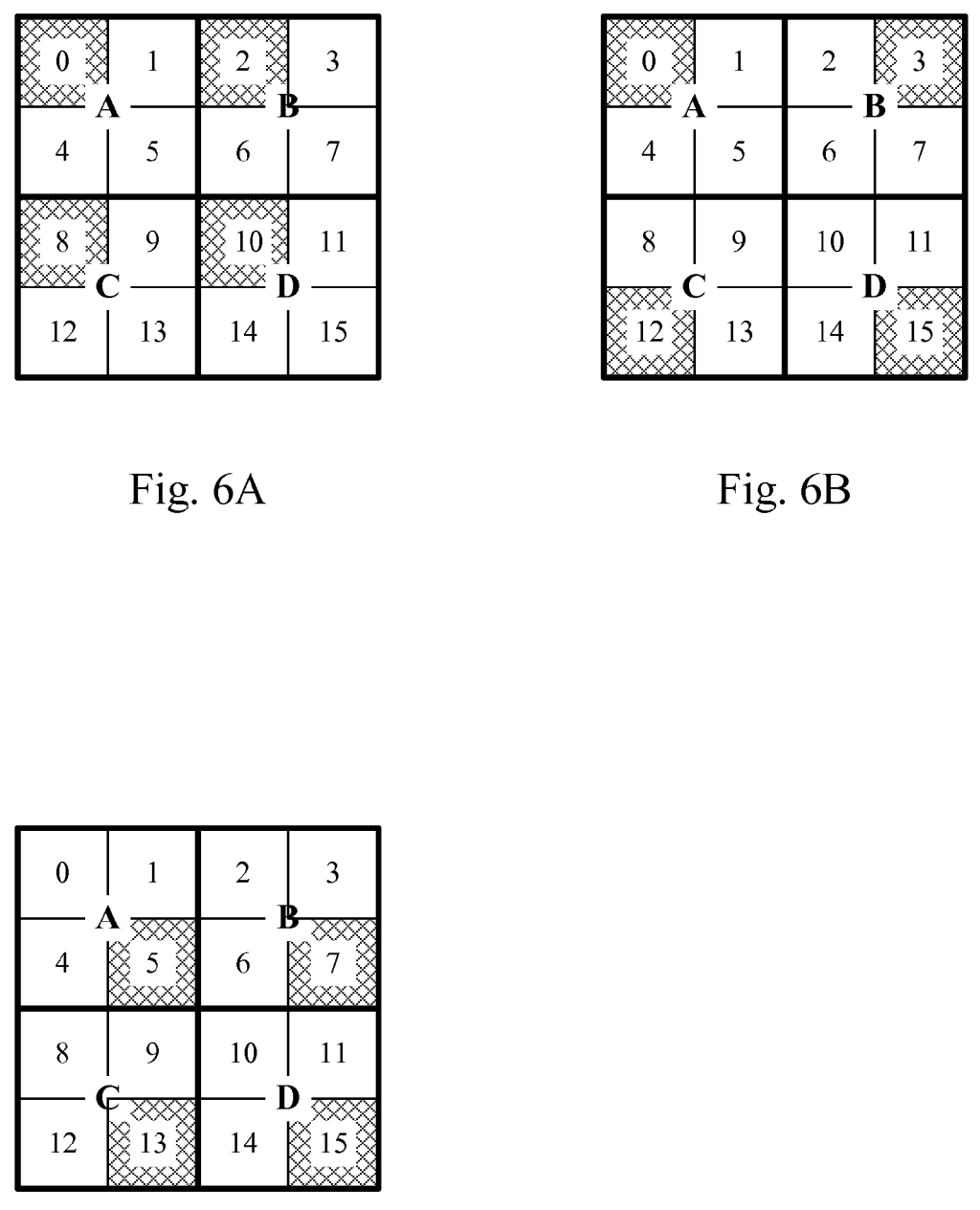

For the first-stage motion data compressions, the motion sharing area is equally divided into to-be-compressed units. The to-be-compressed unit is defined as an aggregation of smallest motion data blocks (e.g., 4×4 blocks in HEVC and 3D-HEVC) for storing motion parameters in the motion data buffer. The to-be-compressed unit always has a square shape for HEVC and 3D-HEVC. In the first-stage motion data compression, all smallest motion data blocks in the to-be-compressed unit share the same representative motion parameters. In one example, the motion data of the top-left smallest unit within each to-be-compressed unit can be used as the representative motion parameter for the corresponding to-be-compressed unit as shown in FIG. 6A. Smallest motion data blocks 0, 2, 8 and 10 are used as representative blocks for to-be-compressed 8×8 units (labeled as A, B, C and D in FIG. 6A) respectively. In another example, the dominant motion parameter within the to-be-compressed unit is used as the representative motion parameters for each to-be-compressed unit. In yet another example, the median, mean, average, or other linear combination of motion parameters associated with all the smallest motion data units within the to-be-compressed unit is used as the representative motion parameters for each to-be-compressed unit. Alternatively, the median, mean, average, or other linear combination of motion parameters associated with at least a part of the smallest motion data blocks within the to-be-compressed unit is used as the representative motion parameters for each to-be-compressed unit.

In another embodiment of the present invention, a two-stage motion data compression scheme that is aligned with the motion data buffer reduction of HTM-4.0 is disclosed. When we say the invented scheme is aligned with the one of HTM-4.0, it means the invented scheme and the original one used in HTM-4.0 will result in the same compressed motion data which will be referred by the other AUs. In the first stage, for each 16×16 block (i.e., motion sharing area) with sixteen 4×4 blocks, the motion data associated with four 4×4 blocks (i.e., blocks 0, 3, 12 and 15) as shown in FIG. 6B are used as the representative motion data for respective 8×8 blocks (i.e., to-be-compressed units indicated by A, B, C and D). For example, all blocks in to-be-compressed unit A (i.e., blocks 0, 1, 4 and 5) share motion parameters associated with block 0. In the second stage, for each 16×16 block, the motion data from the top-left 4×4 block (i.e., smallest motion data block 0) is used as the representative motion for the 16×16 block. As mentioned before, while 16×16 block size is being used in the HEVC standard, the motion sharing area may have other block sizes.

A detailed process of two-stage motion data compression is described as follows. The first-stage 4:1 motion data compression can be performed for each to-be-compressed unit (e.g., 8×8 block) immediately after each picture is coded. The motion parameter of the top-left 4×4 block of each 8×8 to-be-compressed unit is used as the representative motion parameter as shown in FIG. 6A. After the first-stage compression, motion data is stored at ¼ resolution in the motion data buffer. After all pictures within the same AU are coded, a second-stage 4:1 motion data compression is then applied to the motion parameters already compressed by the first-stage motion data compression. In the second-stage 4:1 motion data compression, the motion parameter of top-left 4×4 block (i.e., block 0) among the first-stage representative blocks (i.e., blocks 0, 2, 8 and 10) is used as the representative motion parameter of the 16×16 block. After the second-stage compression, motion data is stored in the second motion buffer at ¹⁄₁₆ resolution of the original motion data. While two separate motion data buffers (520 and 530) are shown in FIG. 5, the two buffers may share a same storage as well.

Another detailed process of progressive motion data buffer compression is described as follows. The first-stage 4:1 motion data compression can be performed for each to-be-compressed unit (e.g., 8×8 block) immediately after each picture is coded. After each picture is coded, a 4:1 compression (first-stage motion data compression) is immediately performed for each to-be-compressed unit (e.g., 8×8 block). In this example, the motion parameters of bottom-right 4×4 block of the to-be-compressed unit is used as the representative motion parameter as shown in FIG. 6C, where 4×4 blocks 5, 7, 13 and 15 are used as representative blocks for to-be-compressed units A, B, C and D respectively. After the first-stage compression, motion data is stored in the motion data buffer at quarter resolution. After all pictures within the same AU are coded, a second-stage 4:1 compression is then performed to the motion parameters already compressed by the first-stage motion data compression, in which the motion parameter of bottom-right 4×4 block (i.e., block 15) is used as the representative motion parameters for the 16×16 block. After the second-stage compression, motion data is stored in the motion buffer at ¹⁄₁₆ resolution of the original motion data.

Another detailed process of progressive motion data buffer compression is described as follows. The first-stage 4:1 motion data compression can be performed for each to-be-compressed unit (e.g., 8×8 block) immediately after each picture is coded. After each picture is coded, a 4:1 compression (first-stage motion data compression) is immediately performed for each to-be-compressed unit (e.g., 8×8 block). In this example, the motion parameters of bottom-right 4×4 block to the center of the to-be-compressed unit is used as the representative motion parameter as shown in FIG. 6C, where 4×4 blocks 5, 7, 13 and 15 are used as representative blocks for to-be-compressed units A, B, C and D respectively. After the first-stage compression, motion data is stored in the motion data buffer at quarter resolution. After all pictures within the same AU are coded, a second-stage 4:1 compression is then performed to the motion parameters already compressed by the first-stage motion data compression, in which the motion parameter of bottom-right 4×4 block to the center (i.e., block 15 within a 8×8 block which is composed of blocks 5, 7, 13 and 15) is used as the representative motion parameters for the 16×16 block. After the second-stage compression, motion data is stored in the motion buffer at ¹⁄₁₆ resolution of the original motion data.

In yet another embodiment of the present invention, the two-stage motion data compression is only applied to the pictures that the associated motion data is referred by other pictures within the same AU. For example, in HTM-4.0, only the motion data of the texture pictures are referred within the AU. Accordingly, the two-stage motion data compression is applied to the texture pictures only. On the other hand, the depth maps still use conventional motion data compression. The two-stage motion data compression can also be applied with various constraints. For example, the two-stage motion data compression is only applied to the pictures that are referred by other pictures as reference pictures. In another example, the two-stage motion data compression is not applied to the pictures in base view or in base layer. In other words, the two-stage motion data compression is only applied to the pictures in dependent view or in enhancement layer. A system that selectively uses the two-stage motion data compression may use syntax to signal in the sequence level, picture level or slice level to indicate whether the two-stage motion data compression is used.

In another embodiment of the present invention, an immediate motion data compression is disclosed, where the motion data associated with a picture is compressed to final compression target directly after the picture is coded without waiting for all pictures in an AU to be coded. For each 16×16 unit, the motion parameters of the top-left 4×4 block are used as the representative motion parameters. Therefore, the motion data can be stored at 1/16 resolution in the motion data buffer after each picture is coded. Compared to the progressive motion data buffer compression with 4 to 1 compression in both first stage and second stage, this embodiment further reduces the buffer required to store the motion data. Therefore, the bandwidth for writing and reading motion data is further reduced.

Figure 7:
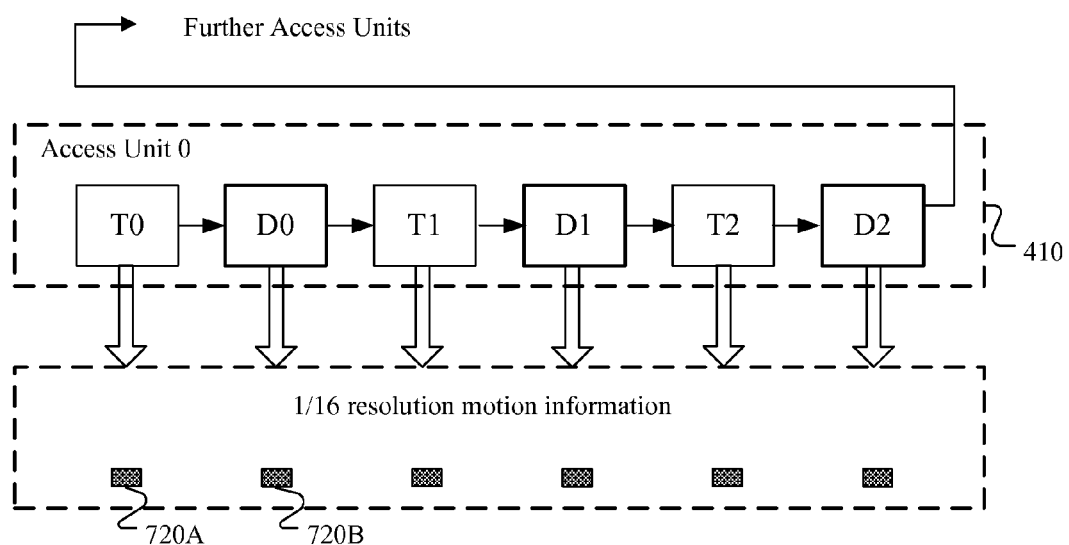
FIG. 7 illustrates an exemplary system diagram incorporating two-stage motion data compression according to another embodiment of the present invention.

FIG. 7 illustrates an example of motion data buffer requirement according to the immediate scheme. The motion information associated with each picture (texture, depth or any types of picture) is compressed to 1/16 resolution of the original motion information after the picture is coded. Therefore, the motion data buffer only needs to store motion information in the 1/16 resolution. In FIG. 7, motion information associated with texture picture T0 is compressed to 1/16 resolution (block 720A) after T0 is compressed. Motion information associated with depth map D0 is compressed to 1/16 resolution (block 720B) after D0 is compressed.

The performance of motion data compression incorporating an immediate scheme according to an embodiment of the present invention is compared with the performance of motion data compression according to HTM-4.0 as shown in Table 2. The BD-rate for texture pictures in view 1 and view 2 may lose up to 0.8% performance measured by BD-rate as shown in Table 2. The second group of performance is the bitrate measure for texture video only (video PSNR/video bitrate), total bitrate for texture video and depth maps (video PSNR/total bitrate) and total bitrate for video of synthesized view (synth PSNR/total bitrate). As shown in Table 2, the average performance loss is between 0.3 to 0.4%. The processing times (encoding time, decoding time and rendering time) are slightly improved.

consisting of a first plurality of smallest-motion-data-blocks is selected for motion data compression. The input data may be retrieved from storage such as a computer memory, buffer (RAM or DRAM) or other media. The input data may also be received from a processor such as a controller, a central processing unit, a digital signal processor or electronic circuits that derives the input data. The motion sharing area is divided into multiple to-be-compressed units as shown in step 820, wherein each to-be-compressed unit consists of a second plurality of smallest motion data blocks. Second representative motion data is selected for the second plurality of smallest motion data blocks to share as shown in step 830. First compressed motion data corresponding to the second representative motion data associated with the picture unit is stored in a buffer after the picture unit is encoded or decoded as shown in step 840, wherein the second representative motion data associated with the picture unit is used for first encoding or decoding process of another picture unit in the access unit. The steps from 820 to 840 correspond to the first-stage motion data compression. First representative motion data is selected for the first plurality of smallest motion data blocks to share as shown in step 850. Second compressed motion data is generated based on the first representative motion data associated with the picture units of the access unit as shown in step 860, wherein the second compressed motion data is used for second encoding or decoding process of the picture units in another access unit. The steps from 850 to 860 correspond to the second-stage motion data compression.

The flowchart shown above is intended to illustrate an example of inter-view prediction based on sub-block partition. A person skilled in the art may modify each step, re-arranges the steps, split a step, or combine steps to practice the present invention without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other

TABLE 2

| | video 0 | video 1 | video 2 | video PSNR/video bitrate | video PSNR/total bitrate | synth PSNR/total bitrate | enc time | dec time | ren time |
|---|---|---|---|---|---|---|---|---|---|
| Balloons | 0.0% | 1.2% | 1.3% | 0.5% | 0.5% | 0.4% | 98.2% | 101.0% | 100.2% |
| Kendo | 0.0% | 0.9% | 0.9% | 0.4% | 0.4% | 0.4% | 97.5% | 99.0% | 98.8% |
| Newspaper_CC | 0.0% | 0.8% | 0.7% | 0.3% | 0.3% | 0.7% | 97.2% | 101.4% | 97.3% |
| GT_Fly | 0.0% | 0.8% | 0.5% | 0.2% | 0.2% | 0.3% | 99.0% | 99.2% | 98.9% |
| Poznan_Hall2 | 0.0% | 0.2% | 0.2% | 0.1% | 0.1% | 0.3% | 98.8% | 98.9% | 98.9% |
| Poznan_Street | 0.0% | 0.4% | 0.7% | 0.2% | 0.2% | 0.2% | 97.3% | 99.1% | 97.3% |
| Undo_Dancer | 0.0% | 0.8% | 0.9% | 0.3% | 0.3% | 0.4% | 98.6% | 99.7% | 101.6% |
| 1024 × 768 | 0.0% | 1.0% | 1.0% | 0.4% | 0.4% | 0.5% | 97.7% | 100.5% | 98.8% |
| 1920 × 1088 | 0.0% | 0.5% | 0.6% | 0.2% | 0.2% | 0.3% | 98.4% | 99.2% | 99.2% |
| average | 0.0% | 0.7% | 0.8% | 0.3% | 0.3% | 0.4% | 98.1% | 99.8% | 99.0% |

Figure 8:
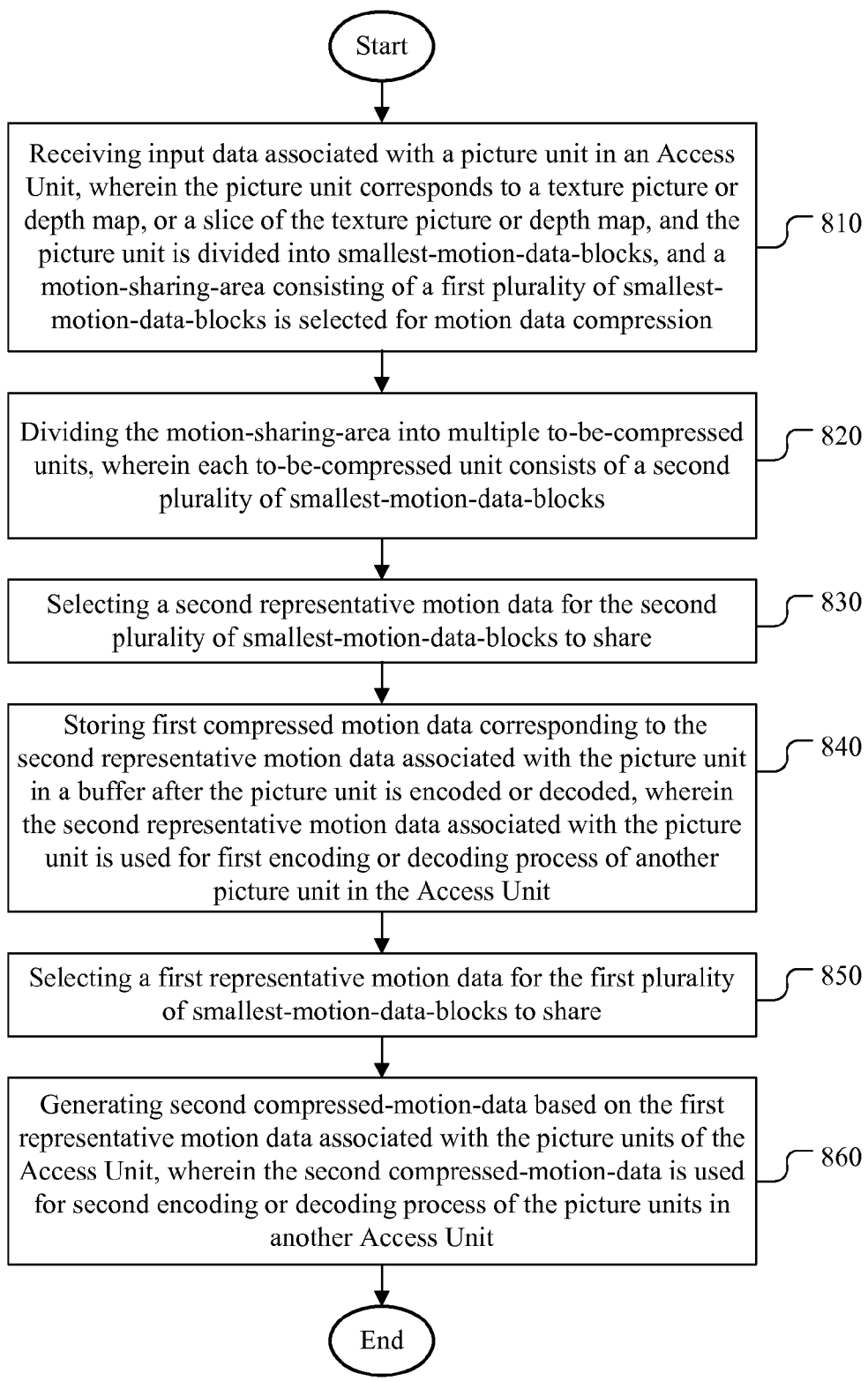
FIG. 8 illustrates an exemplary flowchart of a three-dimensional coding system incorporating two-stage motion data compression according to an embodiment of the present invention.

FIG. 8 illustrates an exemplary flowchart for a three-dimensional, multi-view and scalable coding system incorporating the two-stage motion data compression according to an embodiment of the present invention. The system receives input data associated with a picture unit in an access unit as shown in step 810, wherein the picture unit corresponds to a texture picture or depth map, or a slice of the texture picture or depth map, and the picture unit is divided into smallest motion data blocks, and a motion sharing area embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be a circuit integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method for three-dimensional video coding, multiview video coding and scalable video coding, the method comprising:
   receiving input data associated with a picture unit in an access unit, wherein the picture unit corresponds to a texture picture or depth map, or a slice of the texture picture or depth map, and the picture unit is divided into smallest motion data blocks, and a motion sharing area consisting of a first plurality of smallest motion data blocks is selected for motion data sharing;
   applying first motion data compression, wherein said applying first motion data compression comprises:
   dividing the motion sharing area into multiple to-be-compressed units, wherein each to-be-compressed unit consists of a second plurality of smallest motion data blocks;
   selecting second representative motion data for the second plurality of smallest motion data blocks to share; and
   storing first compressed motion data corresponding to the second representative motion data associated with the picture unit in a buffer after the picture unit is encoded or decoded, wherein the second representative motion data associated with the picture unit is used for first encoding or decoding process of another picture unit in the access unit; and
   applying second motion data compression, wherein said applying second motion data compression comprises:
   selecting first representative motion data for the first plurality of smallest motion data blocks to share; and
   generating second compressed motion data based on the first representative motion data associated with the picture units of the access unit, wherein second compressed motion data is used for second encoding or decoding process of the picture units in another access unit.

2. The method of claim 1, wherein the smallest motion data block corresponds to a 4×4 block.

3. The method of claim 1, wherein the to-be-compressed unit corresponds to an 8×8 block.

4. The method of claim 1, wherein the motion sharing area corresponds to a 16×16 block.

5. The method of claim 1, wherein the second representative motion data corresponds to second motion data of a second representative smallest motion data block selected from the second plurality of smallest motion data blocks.

6. The method of claim 5, wherein the second representative smallest motion data block corresponds to a top-left or bottom-right smallest motion data block of the second plurality of smallest motion data blocks.

7. The method of claim 5, wherein the second representative motion data corresponds to dominant motion data, median motion data, average motion data, or linear motion data combination of the second plurality of smallest motion data blocks or a part of the plurality of smallest motion data blocks.

8. The method of claim 5, wherein the first representative motion data corresponds to first motion data of a first representative smallest motion data block selected from a plurality of second representative smallest motion data blocks in the motion sharing area.

9. The method of claim 1, wherein the first representative motion data corresponds to first motion data of a first representative smallest motion data block selected from the first plurality of smallest motion data blocks.

10. The method of claim 9, wherein the first representative smallest motion data block corresponds to a top-left or bottom-right smallest motion data block of the first plurality of smallest motion data blocks.

11. The method of claim 9, wherein the first representative motion data corresponds to dominant motion data, median motion data, average motion data, or linear motion data combination of the first plurality of smallest motion data blocks or a part of the plurality of smallest motion data blocks.

12. The method of claim 1, wherein said applying first motion data compression is only applied to the texture pictures.

13. The method of claim 1, wherein said applying first motion data compression is only applied to reference pictures.

14. The method of claim 1, wherein said applying first motion data compression is only applied to dependent-view or enhancement-layer pictures.

15. The method of claim 1, wherein said applying first motion data compression is only applied to independent-view or base-layer pictures.

16. The method of claim 1, wherein syntax is signaled in a sequence level, picture level or slice level of a video bitstream to indicate whether said applying first motion data compression is used.

17. A method for three-dimensional video coding, multiview video coding and scalable video coding, the method comprising:
   receiving input data associated with a picture unit in an access unit, wherein the picture unit corresponds to a texture picture or depth map, or a slice of the texture picture or depth map, and the picture unit is divided into 4×4 blocks;
   applying first 4 to 1 compression to first motion data associated with the picture unit in the access unit by using a top-left 4×4 block of an 8×8 block as a first representative block, wherein said applying first 4 to 1 compression is performed within a substantially short period after the picture unit in the access unit is coded or decoded;

storing motion data of the first representative blocks associated with the picture unit in a motion data buffer, wherein all 4×4 blocks within the 8×8 block share same first motion data stored for the first representative block during first encoding or decoding process of another picture unit in the access unit; and applying second 4 to 1 compression to the motion data associated with the picture units in the access unit by using the top-left 4×4 block of a 16×16 block as a second representative block, wherein said applying second 4 to 1 compression is performed after all picture units in the access unit are coded or decoded, wherein all 4×4 blocks within the 16×16 block share same second motion data stored for the second representative block during second encoding or decoding process of the picture units in another access unit.

18. An apparatus for three-dimensional video coding, multi-view video coding and scalable video coding, the apparatus comprising:

one or more electronic circuits, wherein said one or more electronic circuits are configured to:

receive input data associated with a picture unit in an access unit, wherein the picture unit corresponds to a texture picture or depth map, or a slice of the texture picture or depth map, and the picture unit is divided into smallest motion data blocks, and a motion sharing area consisting of a first plurality of smallest motion data blocks is selected for motion data sharing;

divide the motion sharing area into multiple to-be-compressed units, wherein each to-be-compressed unit consists of a second plurality of smallest motion data blocks;

select second representative motion data for the second plurality of smallest motion data blocks to share;

store first compressed motion data corresponding to the second representative motion data associated with the picture unit in a buffer after the picture unit is encoded or decoded, wherein the second representative motion data associated with the picture unit is used for first encoding or decoding process of another picture unit in the access unit;

select first representative motion data for the first plurality of smallest motion data blocks to share; and generate second compressed motion data based on the first representative motion data associated with the picture units of the access unit, wherein the second compressed motion data is used for second encoding or decoding process of the picture units in another access unit.

* * * * *